(12) United States Patent
Bothe et al.

(10) Patent No.: US 7,574,315 B2
(45) Date of Patent: Aug. 11, 2009

(54) DEVICE AND METHOD FOR CALIBRATING AN IMAGE SENSOR

(75) Inventors: Hans-Dieter Bothe, Seelze (DE); Steffen Abraham, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/554,251

(22) PCT Filed: Feb. 19, 2004

(86) PCT No.: PCT/DE2004/000305
§ 371 (c)(1),
(2), (4) Date: Aug. 31, 2006

(87) PCT Pub. No.: WO2004/094196
PCT Pub. Date: Nov. 4, 2004

(65) Prior Publication Data
US 2007/0033999 A1    Feb. 15, 2007

(30) Foreign Application Priority Data
Apr. 24, 2003 (DE) ................ 103 18 500

(51) Int. Cl.
*G01D 18/00* (2006.01)
*G01P 21/00* (2006.01)
*G01R 35/00* (2006.01)
*G01F 25/00* (2006.01)

(52) U.S. Cl. ........................ 702/85; 702/104

(58) Field of Classification Search ............ 702/45, 702/50, 85, 100, 58, 104, 116, 183, 185, 702/94, 95; 340/438, 439; 250/252.1, 339.09, 250/370.01
See application file for complete search history.

(56) References Cited

U.S. PATENT DOCUMENTS

| 5,978,081 | A | 11/1999 | Michael et al. ......... 356/243.1 |
| 6,005,958 | A | 12/1999 | Farmer et al. ............... 382/103 |
| 2002/0016692 | A1* | 2/2002 | Langmeier et al. .......... 702/104 |
| 2002/0030608 | A1 | 3/2002 | Boucourt .................... 340/945 |
| 2006/0187303 | A1* | 8/2006 | Bothe et al. ................. 348/118 |
| 2007/0163338 | A1* | 7/2007 | Konzelmann et al. ...... 73/118.2 |

FOREIGN PATENT DOCUMENTS

| DE | 196 21 612 | * 12/1997 |
| WO | 01 43072 | 6/2001 |
| WO | 01 60662 | 8/2001 |

OTHER PUBLICATIONS

English Abstract of DE 196 21 612, Dec. 1997.*

* cited by examiner

*Primary Examiner*—Michael P Nghiem
(74) *Attorney, Agent, or Firm*—Kenyon & Kenyon

(57) ABSTRACT

A device and a method are proposed for monitoring, tracking and determining at least one calibration parameter of the geometrical calibration of at least one image sensor, the at least one image sensor monitoring a scene that stays the same in parts. In one exemplary embodiment, the at least one image sensor is used for monitoring the passenger compartment of a motor vehicle.

6 Claims, 5 Drawing Sheets

DEVICE AND METHOD FOR CALIBRATING AN IMAGE SENSOR

This application is a 371 of PCT/DE04/00305, filed on Feb. 19, 2004.

FIELD OF THE INVENTION

The present invention relates to a method for determining calibration parameters of an image sensor.

BACKGROUND INFORMATION

Motor vehicle manufacturers plan the application of sensor systems, especially of image sensors, for monitoring the passenger compartment of a motor vehicle. The use of image sensors is provided for intelligent air bag control. Within the scope of intelligent air bag control, one task is the classification of seat occupancy in the motor vehicle, in order, for example, to prevent injuries in small children by the triggering of air bags in the case of reverse-mounted child seats. Other planning involves monitoring the position of body parts of the passengers, such as the head or the torso, and/or the seating attitude of the passengers with respect to the air bag by a so-called "out-of-position detection", so as, in particular, to avoid injuries by too close a positioning of the head to the air bag module when the latter is triggered.

As an example, from PCT International Publication No. 01/60662, a method and a device are known for the detection of seat occupancy with the aid of a video sensor system and a foot space sensor system. It is proposed there to record the height of the head of a person occupying a seat using the video sensor system, to carry out, together with the foot space sensor system, a classification of the seat occupancy, and to control the air bag as a function of the seat occupancy. Any hints on a device and a method for determining calibration parameters of an image sensor of the video sensor system are missing from PCT International Publication No. 01/60662 01/60662.

SUMMARY OF THE INVENTION

The device described below for determining at least one calibration parameter of at least one image sensor, upon a detected decalibration of the at least one image sensor a processing unit determining the at least one calibration parameter as a function of image signals, which the at least one image sensor derives from at least one invariant pattern, has the advantage that faulty functioning of at least one image sensor is able to be detected as a result of decalibrations and in addition is able to be automatically corrected. Alternatively, or in addition, it is of advantage to report a detected decalibration to at least one subsequent system and/or to the driver (operator) of the motor vehicle. In an advantageous manner, the automatic monitoring of the calibration contributes to a reliable functioning of image sensors, and thereby especially makes possible the use of image sensors, for applications in the motor vehicle passengers compartment, that are critical to safety.

Also in an advantageous manner, the expenditure for the assembly of the at least one image sensor in the motor vehicle is reduced by the automatic determination of at least one calibration parameter. This makes it unnecessary to carry out special calibration methods during the production of the motor vehicle and/or during repairs. Furthermore, the device contributes to tight manufacturing tolerances, which would have to be specified without the device, described below, for maintaining calibration parameters, being able to be loosened up. This yields an especially advantageous reduction in costs both in the manufacturing and/or the repair of a motor vehicle. In summary, the device described below is suitable in an advantageous manner for mass production application of image sensors for those applications in motor vehicles that are critical to safety, particularly for intelligent air bag control, particularly since faulty functioning of image sensors is detected especially in the form of decalibration.

What is particularly advantageous is the formation of the at least one invariant pattern by at least one reference object mounted in the scene for the determination of the at least one calibration parameter. The utilization of signalized reference objects for the calibration of at least one image sensor is advantageous. Particularly advantageous are the signalized reference objects in the passenger compartments of motor vehicles. Signalized reference objects have the advantage that they are easy to record by the sensor system, and because of the signalization, they are reliably able to be identified in the measuring data, using means of signal processing.

It is advantageous if the signalization of the reference objects is achieved by an especial brightness, either actively by illumination means, such as LED diodes and/or infrared light-emitting diode, and/or passively by surfaces of high reflectivity (reflective capacity, albedo). Therefore, special advantages come about due to reference objects which are developed as means of illumination, particularly as light-emitting diode (LED diode) and/or have high reflectivity. Reference objects developed in this manner contribute to simple recordability of the at least one invariant pattern by the processing unit.

It is also advantageous if the signalization of the at least one reference object is achieved by a special shape. Especially advantageous are reference objects that have a geometrical shape, such as, for instance, a point and/or a circle and/or a triangle and/or a quadrilateral and/or a square. Alternatively, or additionally, letters and/or characters and/or logos are advantageous as reference objects. This contributes to a simple ability to identify the at least one invariant pattern in the image signals.

It is also advantageous to arrange reference objects to form at least one two-dimensional (2D) and/or at least one three-dimensional (3D) invariant pattern, the pattern having a geometrical shape such as, for instance, a cross and/or a circle and/or a character. This variant of the device described below is particularly advantageous in connection with signalized reference objects, especially those signalized by means of illumination such as light-emitting diodes. This helps in having the at least one invariant pattern able to be easily recognized by the processing unit and possibly having various invariant patterns able to be distinguished from one another.

It is particularly advantageous if the at least one reference object is mounted on at least one object of the scene relevant with respect to the monitoring function of the at least one image sensor. In particular, if the device is used in a motor vehicle, it is especially advantageous if at least one known reference object and/or one invariant pattern (reference pattern) is located on at least one object that is relevant for the respective application, such as, for example, the air bag flap and/or the actual air bag and/or the steering wheel. This makes possible the measurement of the distance between at least one or several of these relevant objects and other objects in the motor vehicle's passenger compartment that are also not signalized, without the position and alignment of the sensor system, that is, of the at least one image sensor, to this at least one relevant object having to be known a priori, for instance by measuring using an additional sensor.

Another advantage occurs if the at least one invariant pattern is alternatively or additionally formed by at least one naturally occurring object of the scene. It is especially advantageous if, for the purpose of calibration, the position of objects, present in the motor vehicle conditioned upon the model, is monitored and followed in the image signals. Objects, present in the motor vehicle conditioned upon the model, are, for instance, at least one door pillar and/or at least one instrument and/or at least one inside roof lining of the motor vehicle roof.

The device described below is advantageous for determining at least one calibration parameter of at least one CMOS image sensor and/or at least one CCD image sensor and/or at least one monocular image sensor and or at least one stereo camera and/or at least one image sensor giving an image in depth.

The advantages of the device described above correspondingly apply to the method for determining at least one calibration parameter of at least one image sensor.

Particularly advantageous is a computer program having program code means for carrying out all the steps or at least the essential steps of the method described below, when the program is run on a computer. The use of a computer program makes possible the rapid and cost-effective adaptation of the method to different invariant patterns and/or different scenes, especially different passenger compartments of motor vehicles.

DETAILED DESCRIPTION

Figure 1:
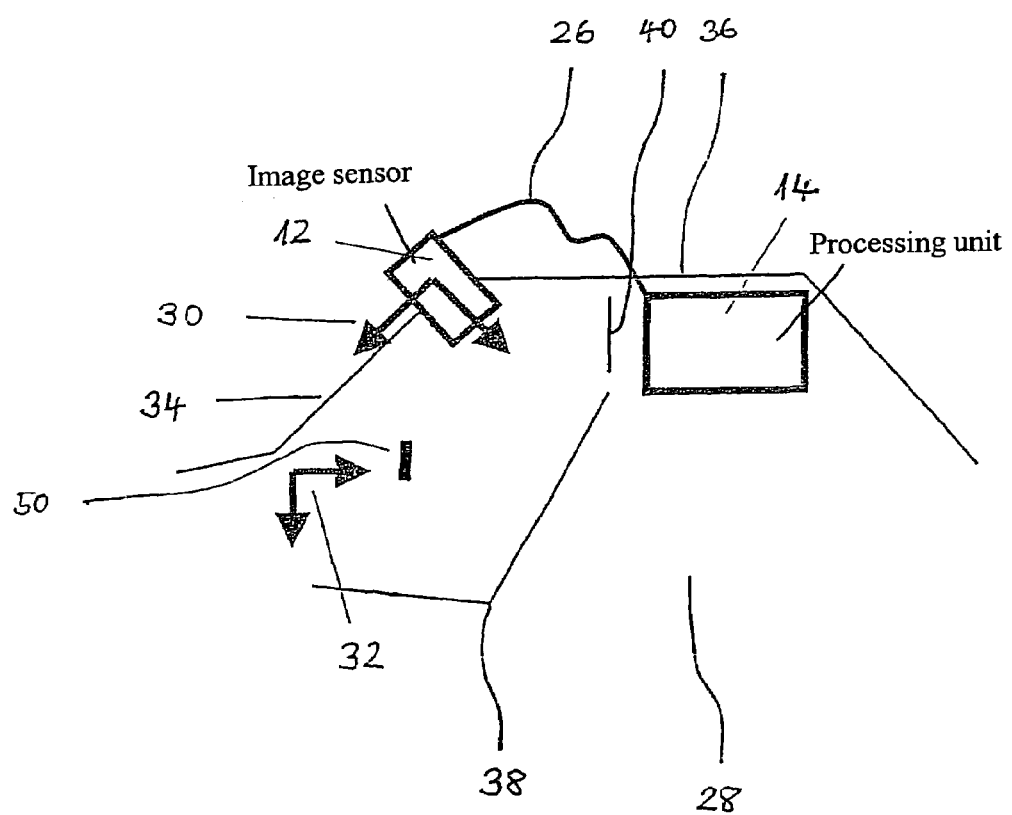
FIG. 1 shows a drawing of a general view.

Below, we describe a device and a method for monitoring, tracking and determining at least one calibration parameter of the geometrical calibration of at least one image sensor, the at least one image sensor being configured in such a way that it monitors a scene with the parts remaining the same. In one exemplary embodiment, the at least one image sensor is used for monitoring the passenger compartment of a motor vehicle.

When image sensors are used within the scope of intelligent air bag control in the passenger compartment of the vehicle, particularly for the classification of seat occupancy and/or out-of-position detection, the production of a geometrical position relationship between measuring data and the passenger compartment of the vehicle is necessary, that is, for example, the body and/or the air bag module. To do this, two different assumed designs are conceivable. First, it is possible to describe the measured value recording explicitly by a mathematical model. The mathematical model contains numerical calibration parameters which describe the position of the at least one image sensor with respect to the motor vehicle (extrinsic calibration parameters of the extrinsic calibration) and/or numerical calibration parameters which characterize the measured value recording in at least one image sensor (intrinsic calibration parameters of the intrinsic calibration). Intrinsic calibration parameters are, for example, at least one camera constant and/or at least one camera principal point and/or at least one register parameter. In the second procedure, there is a direct evaluation of the measured data, for instance, using a classificator. In this context, there exist explicitly no numerical calibration parameters in the overall system of image sensor and evaluation. For the classification, an adaptive classificator is used in the processing unit, for instance, a neuronal network. The classificator is trained first. To do this, using the sensor, various seat occupations are recorded, for instance, seat empty and/or child's seat, and, for the situation, one manually stores the desired, correct decision as, for example, seat empty. The classificator is notified of measured data having a correct decision, and it extracts from this data for the classification (training of the neuronal network). In its later use, the classificator will derive a decision from arriving measured data. The classificator knows nothing about the geometry and the calibration. If the image sensor changes its position in the motor vehicle, it is not sure that the classificator will deliver correct decisions without renewed training. After beginning to use an image sensor in a motor vehicle, for monitoring the passenger compartment, corresponding to the two procedures, either the calibration parameters have to be known and/or determined, or the properties of the measured value recording are implicitly assumed to be known or to be constant over the time period of use. These properties of the at least one image sensor, that there is an explicitly and/or implicitly known geometrical position relationship between the measured data and the monitored scene, particularly the passenger compartment of the motor vehicle, is designated as the geometrical calibration of the at least one image sensor.

The subsequently described device and the method perform automatic monitoring and detection of decalibration, for instance, by maladjustment and/or changes in the measured value recording, of the at least one image sensor. Besides that, the device and the method make possible the automatic determination and/or tracking of at least one calibration parameter of the at least one image sensor during the operation of the sensor. For the automatic monitoring of the decalibration and the calibration of the at least one image sensor, at least one special signalized reference object, which, in the preferred exemplary embodiment is applied in the passenger compartment of a motor vehicle, and/or at least one naturally occurring object of the scene, in the preferred exemplary embodiment at least one design-conditioned object present in the motor vehicle, are used as reference objects. The reference objects are observed using the at least one image sensor. The measured data of the at least one image sensor appertaining to the reference objects are also evaluated by comparing the measured data with the setpoint data. In the light of the difference between the measured data and the setpoint data the functioning of the at least one image sensor is monitored and/or the at least one image sensor is calibrated after the determination of at least one calibration parameter.

FIG. 1 shows a general drawing of the preferred exemplary embodiment to explain the use of image sensor 12, which is being applied to the monitoring of passenger compartment 28 of a motor vehicle. Image sensor 12 is applied in the vicinity of windshield 34 and roof 36 of the motor vehicle in such a way that the image coverage area of image sensor 12 records passenger compartment 28 of the motor vehicle. In this context, image sensor 12 records seat 38, for example, the front passenger seat and/or headrest 40. In addition, image sensor 12 possibly records a person (that is not drawn in) and/or other objects in passenger compartment 28, particularly on seat 38. Image sensor 12 is connected to a processing unit 14 via a signal line 26. FIG. 1 shows position 30 of image sensor 12 with respect to reference system 32 of the motor vehicle.

FIG. 1 also shows an air bag module 50, which is applied for the protection of persons in passenger 28 when the motor vehicle is in an accident.

Figure 2:
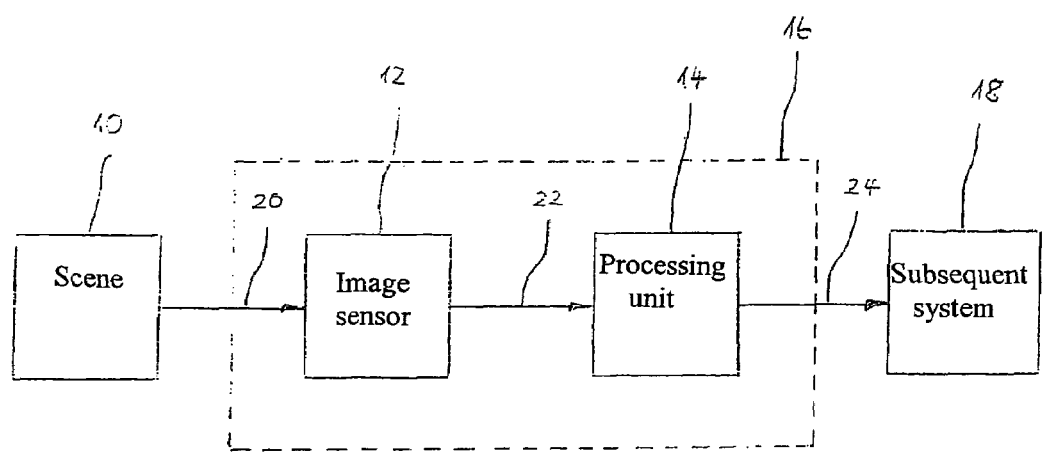
FIG. 2 shows a block diagram.

FIG. 2 shows a block diagram of FIG. 1, composed of scene 10 that is to be monitored, image sensor 12 and a processing unit 14. Scene 10, that is to be monitored, is the passenger compartment of the motor vehicle. From light radiation 20 of scene 10 that is to be monitored, image sensor 12 generates image signals 22. Image signals 22 are transmitted as measured data to processing unit 14 via signal line 26, as shown in FIG. 1. In processing unit 14, first of all, the method described below, for determining at least one calibration parameter, is carried out. Secondly, the processing of image signals 22 of image sensor 12 takes place in processing unit 14, in order to fulfill the monitoring function of image sensor 12. Image sensor 12 and processing unit 14 form measuring system 16. In the preferred exemplary embodiment, image sensor 12 is used for the intelligent control of the air bag. Processing unit 14 evaluates image signals 22 in order to pass on signals of measuring system 24 via a signal line to a subsequent system 18 for the air bag control. The signals of measuring system 24 include data for the classification of the seat occupancy and/or data on out-of-position detection of persons on the seats of the motor vehicle. The transmission of image signal 22 and/or the signals of measuring system 24 on the signal lines takes place electrically and/or optically and/or by radio communication. In one variant of the preferred exemplary embodiment, image sensor 12 and/or processing unit 14 and/or the following system 18 are implemented in one or possibly several units.

Figure 3:
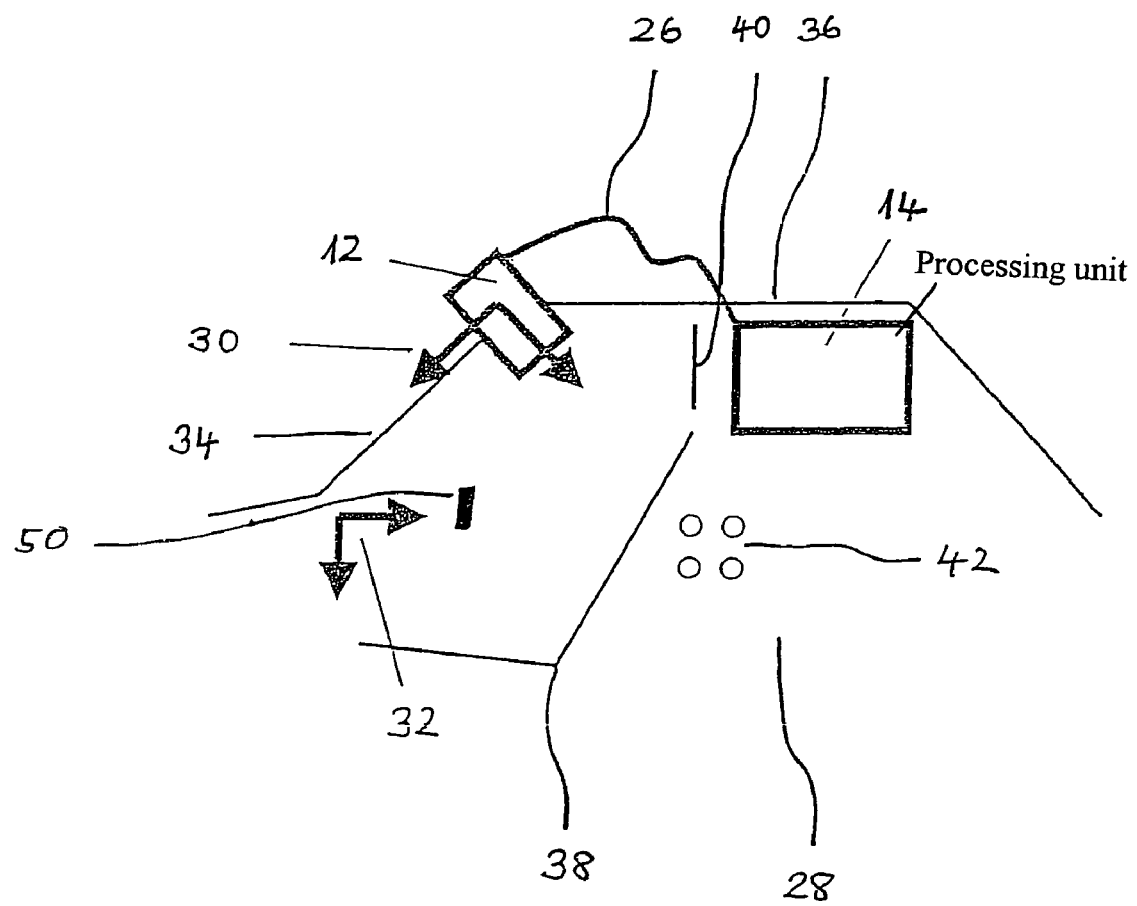
FIG. 3 shows a drawing of the general view of a preferred exemplary embodiment.

FIG. 3 shows a general drawing of the preferred exemplary embodiment having a device for determining at least one calibration parameter of image sensor 12. FIG. 3 represents a broadening of FIG. 1. In the following, only the additional parts in FIG. 3 are explained. In passenger compartment 28 of the motor vehicle, specially signalized objects 42 are inserted in such a way that they are within the image coverage area of the image sensor. Signalized objects 42 are objects which are well detected automatically by each respective sensor system, in the preferred exemplary embodiment this being image sensor 12. In the preferred exemplary embodiment, infrared light-emitting diodes (IR light-emitting diodes) are used. The position of signalized objects 42 in the measured data (image signals) of image sensor 12 (video sensor) are compared to the setpoint position of signalized objects 42 in processing unit 14. When there is a deviation, this detects a decalibration. Furthermore, the position of signalized objects 42 in the sensor measured data is used for the tracking and/or determination of at least one calibration parameter. In one variant of the preferred exemplary embodiment, reference objects having surfaces of high reflectivity are used as signalized reference objects 42. Preferably, signalized reference objects 42 having a reflectivity between 0.5 and 1.0 are used. The synonyms reflectivity, reflection capacity and albedo indicate the proportion of the radiation, incident on a surface, that is reflected. The reflectivity may assume values between 0 and up to 1, a value of 1 meaning that 100% of the incident radiation is being reflected. In addition, the reference objects possibly have a geometrical shape. As geometrical shapes, use is made, for example, of at least one point and/or at least one circle and/or at least one triangle and/or at least one quadrilateral and/or at least one square. Alternatively, or in addition to the geometrical shape, in further variants, at least one letter and/or at least one character and/or at least one logo are used as reference objects. In one additional variant, several reference objects are alternatively or additionally positioned to form a 2D or a 3D pattern, for example, at least one cross and/or at least one circle and/or at least one character. In addition, the reference objects and/or the patterns are mounted alternatively or additionally on at least one object relevant to the respective application, such as the air bag flap and/or the actual air bag and/or the steering wheel. Evaluation unit 14 includes at least one microprocessor and is made up of a plurality of modules shown in FIG. 4, which are developed as programs and/or program steps of the at least one microprocessor.

Figure 4:
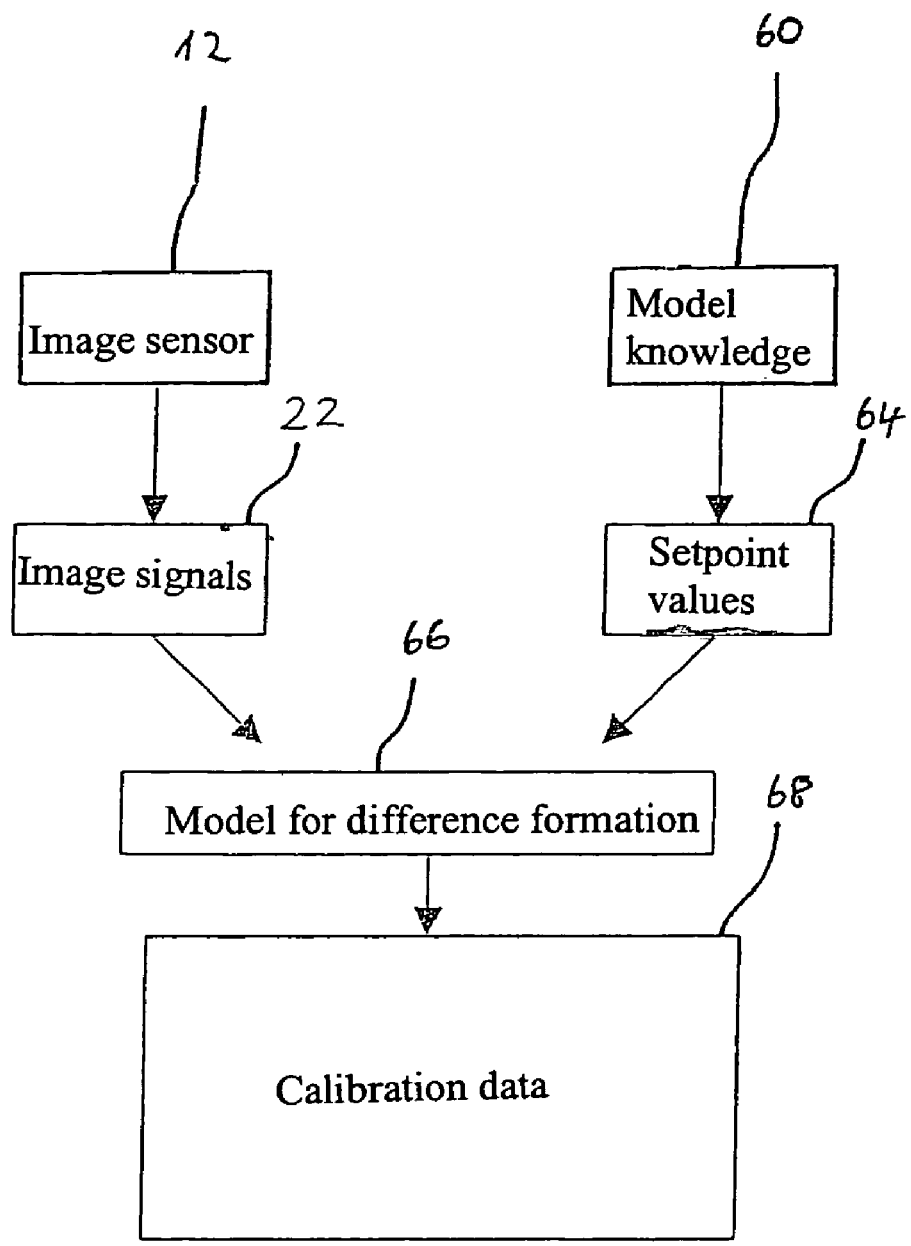
FIG. 4 shows a flow chart.

FIG. 4 shows a flow chart of the method of the preferred exemplary embodiment for the automatic control and/or tracking and/or determination of at least one calibration parameter of the geometrical calibration of at least one image sensor. The method presupposes that there is model knowledge 60 about the geometrical position of reference objects in the passenger compartment of the motor vehicle and/or about setpoint values 64 of the measured data of the at least one image sensor of the reference objects in the passenger compartment of the motor vehicle. During use (operation), the sensor measured data, appertaining to the known reference objects, are detected in the form of image signals 22 by image sensor 12. The sensor measured data (image signals 22) of the reference objects are compared to setpoint data 64 in the model for difference formation 66, and from this there is recognized, in the module for determining calibration data 68, a decalibration of the image sensor and/or, from the sensor measured data (image signals 22) of the reference objects, at least one calibration parameter is determined via a mathematical model of the image sensor imaging. In the motor vehicle's passenger compartment, let us specify a Euclidian coordinate system (vehicle coordinate system). In the vehicle passenger compartment there are point-shaped reference objects Psubi (i=1...N) having known 3D coordinates xi, yi, zi). Furthermore, the setpoint position of an image sensor in the 3D vehicle coordinate system (extrinsic calibration parameter) is given. The setpoint position is made up of 6 parameters, the position of the projection center of the image sensor in the motor vehicle: (tx, ty, tz) and the rotation between the motor vehicle and the image sensor, which is indicated by the rotational angles $\alpha$, $\psi$, $\gamma$. From the rotational angles one obtains the rotational matrix $$R = \begin{pmatrix} r_{11} & r_{12} & r_{13} \\ r_{21} & r_{22} & r_{23} \\ r_{31} & r_{32} & r_{33} \end{pmatrix} \quad (1)$$

$$= \begin{pmatrix} \cos\psi\cos\gamma & \cos\psi\sin\gamma & -\sin\psi \\ \sin\alpha\sin\psi\cos\gamma - \cos\alpha\sin\gamma & \sin\alpha\sin\psi\sin\gamma + \cos\alpha\cos\psi & \sin\alpha\cos\psi \\ \cos\alpha\sin\psi\cos\gamma + \sin\alpha\sin\gamma & \cos\alpha\sin\psi\sin\gamma - \sin\alpha\cos\gamma & \cos\alpha\cos\psi \end{pmatrix}$$

Also known are the intrinsic calibration parameters, the chamber constants $c_x$, $c_y$ and the coordinates of the image principal point $x_H$, $y_H$. The projection of the 3D coordinates ($x_i$, $y_i$, $z_i$) of the point objects into the image, into the image coordinates ($x'_i$, $y'_i$) may be mathematically described by:

$$x'_i = c_x \frac{r_{11}(x_i - t_x) + r_{12}(y_i - t_y) + r_{13}(z_i - t_z)}{r_{31}(x_i - t_x) + r_{32}(y_i - t_y) + r_{33}(z_i - t_z)} + x_H; \quad (2)$$

$$y'_i = c_x \frac{r_{21}(x_i - t_x) + r_{22}(y_i - t_y) + r_{23}(z_i - t_z)}{r_{31}(x_i - t_x) + r_{32}(y_i - t_y) + r_{33}(z_i - t_z)} + y_H;$$

$$d_{SMi} = \sqrt{(x'_{Si} - x'_{Mi})^2 + (y'_{Si} - y'_{Mi})^2} \quad (3)$$

is used for the detection of decalibration of the sensor system. If distances are greater than a predefined threshold ($d_{MSi} > d_{MSmax}$), this establishes that there is decalibration of the image sensor. For a correction of the extrinsic calibration parameters ($\alpha, \psi, \gamma, tx, ty, tz$) of the image sensor, the parameters ($\alpha, \psi, \gamma, tx, ty, tz$) are varied, so that the error square sum between measured image coordinates and projected image coordinates becomes a minimum:

$$\sum_i (x'_{Mi} - x'(\alpha, \psi, \gamma, t_x, t_y, t_z, x_i, y_i, z_i))^2 + \quad (4)$$

$$(y'_{Si} - y'(\alpha, \psi, \gamma, t_x, t_y, t_z, x_i, y_i, z_i))^2 \to \min$$

The image coordinates x'($\alpha, \psi, \gamma$, tx, ty, tz) and y'($\alpha, \psi, \gamma$, tx, ty, tz) are given by the above projection rule (2).

Figure 5:
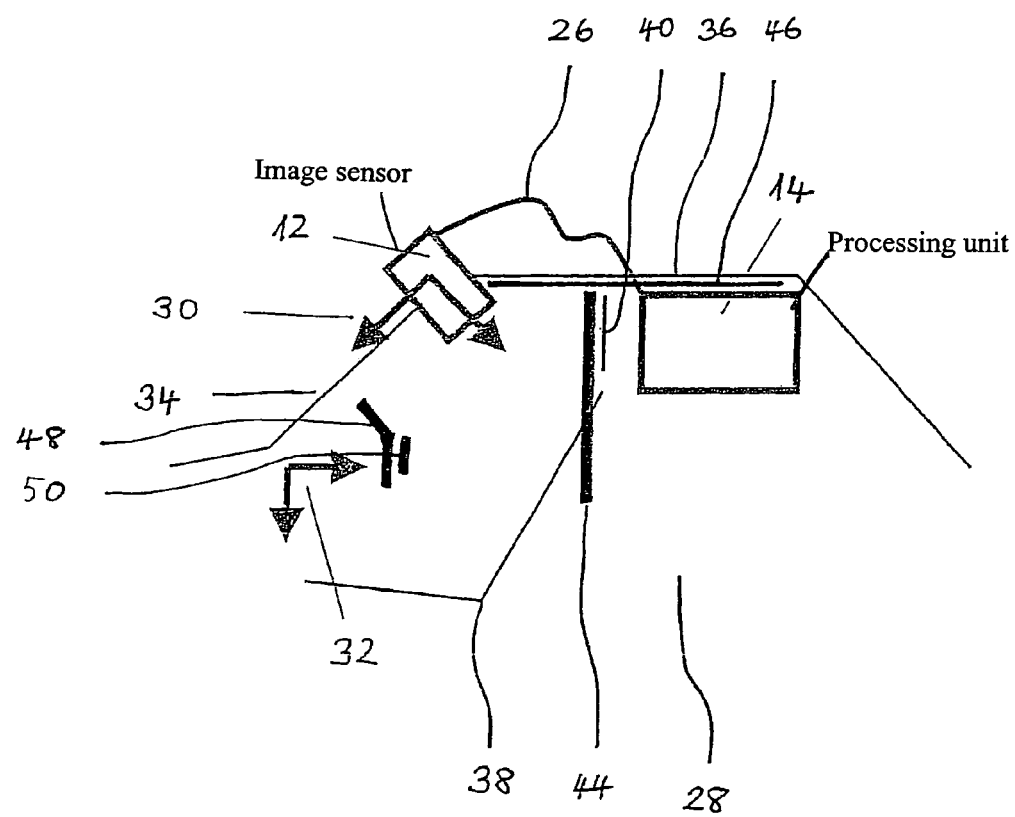
FIG. 5 shows a drawing of a general view of an additional exemplary embodiment.

FIG. 5 shows a general drawing of an additional exemplary embodiment having a device for determining at least one calibration parameter of image sensor 12. FIG. 5 represents a broadening of FIG. 1. In the following, only the additional parts in FIG. 5 are explained. For the purpose of monitoring a decalibration, and/or for determining at least one calibration parameter of the geometrical calibration, in this exemplary embodiment, the position of design-conditioned objects present in the motor vehicle in the sensor measured data is monitored and followed. The design-conditioned objects present in the motor vehicle, such as door pillar 44 and/or the inside roof lining of the vehicle roof 46 and/or instrument 48 are used as reference objects, their position being measured and controlled as a function of the image signals of image sensor 12. Evaluation unit 14 includes, as in the preferred exemplary embodiment according to FIG. 3, at least one microprocessor and is made up of a plurality of modules shown in FIG. 4, which are developed as programs and/or program steps of the at least one microprocessor. In one additional specific embodiment, as reference objects, both at least one reference object (a signalizing reference object), applied in the scene, for the determination of the at least one calibration parameter, and at least one naturally occurring object of the scene, that is, a design-conditioned object present in the passenger compartment of the motor vehicle, are used.

The device described and the method for determining at least one calibration parameter of at least one image sensor are not limited to use in motor vehicle technology. Rather, the procedure described, having the corresponding features, may also be used outside motor vehicle technology. The only assumption is that at least one image sensor is configured in such a way that the at least one image sensor is suitable for monitoring a scene that stays the same in parts. A scene that stays the same in parts is distinguished by the fact that parts of the scene are unchangeable in time. Such scenes occur, for example, in monitoring technology and safety technology. In the monitoring of airports, railroad stations or streets, the scene likewise stays the same. Another case of application is the monitoring of a room, such as the vault of a bank, using at least one image sensor. These scenes, as well, stay the same in parts. Furthermore, the method may be used in the case of at least one image sensor that is set up for monitoring the surroundings of a motor vehicle. Here too, the assumption is that parts of the scene do not change with time. Parts that do not change with time are present if components of the motor vehicle, such as the hood and/or the bumper lie within the image coverage area of the at least one image sensor.

In one variant of the device and the method described, at least one reference object is applied to at least one object of the scene that is relevant with respect to the monitoring function of the at least one image sensor. Relevant objects are distinguished by either being directly the object of the monitoring function of the at least one image sensor 12, or alternatively or additionally being connected indirectly functionally to the monitoring function of the image sensor. In the field of motor vehicle technology, the air bag flap is an example of a relevant object which is directly functionally connected to the monitoring function of the image sensor. Although the image sensor is primarily used for monitoring the occupancy of the seat, the monitoring function is functionally connected to the air bag flap via the air bag control. In the field of safety technology, such as in the monitoring of a bank vault, the safe of the bank is directly the relevant object of the monitoring function of the at least one image sensor.

The device described above and the method are used in additional variants in the cases of at least one or more than one image sensors. As the image sensor, at least one monocular image sensor and/or at least one stereo camera and/or at least one depth image-supplying image sensor are used. Stereo cameras are made up of at least two image sensors, which essentially do a take of the same scene. In-depth image-supplying image sensors are distance image sensors, such as time-of-flight optical sensors (range video camera).

What is claimed is:

1. A device for determining at least one calibration parameter of at least one image sensor, comprising:
   the at least one image sensor, which is configured to monitor a scene of a passenger compartment of a motor vehicle in which at least a portion of the scene remains static over time; and
   at least one processing unit configured to detect a decalibration of the at least one image sensor in the operation of the at least one image sensor, as a function of image signals, and to, upon detecting the decalibration, at least one of report the decalibration to at least one of a subsequent system and the driver, and determine the at least one calibration parameter as a function of the image signals;
   wherein the at least one image sensor derives the image signals at least from at least one invariant pattern in an image coverage range of the at least one image sensor,
   wherein the at least one invariant pattern is formed by at least one reference object applied in the scene for determining the at least one calibration parameter, and wherein the at least one reference object is applied to at least one object of the scene that is relevant with respect to a monitoring function of the at least one image sensor, wherein the at least one reference object is applied to at least one of at least one air bag flap, at least one air bag, and at least one steering wheel in the passenger compartment of the motor vehicle.

2. The device of claim 1, wherein the at least one reference object is at least one of an illumination arrangement, an infrared light-emitting diode, and is configured so that it has a high reflectivity between 0.5 and 1.0.

3. The device of claim 1, wherein the at least one reference object includes at least one of a geometrical shape, a point, a circle, a triangle, a quadrilateral, a square, at least one letter, at least one character, at least one logo.

4. The device of claim 1, wherein the at least one invariant pattern is formed by at least one naturally occurring object of the scene, wherein the at least one invariant pattern is formed by at least one object located in a design-conditioned manner in the passenger compartment of a motor vehicle.

5. A method for determining at least one calibration parameter of at least one image sensor monitoring a scene of a passenger compartment of a motor vehicle in which at least a portion of the scene remains static over time, the method comprising:
- detecting a decalibration of the at least one image sensor during the operation of the at least one image sensor as a function of image signals;
- upon the detection of the decalibration, at least one of reporting the decalibration to at least one of a subsequent system and the driver, and determining the at least one calibration parameter as a function of the image signals; and
- deriving the image signals from at least one invariant pattern in the image coverage range of the at least one image sensor by the at least one image sensor;
- wherein the image signals are at least one of derived from at least one reference object applied in the scene for the determination of at least one calibration parameter, and derived at least from at least one naturally occurring object of the scene, the at least one reference object at least one of being an illuminating arrangement and having a high reflectivity, and
- wherein the image signals are derived from at least one reference object, the at least one reference object being applied to an object of the scene that is relevant with respect to the monitoring function of the at least one image sensor, wherein the at least one reference object is applied to at least one of at least one air bag flap, at least one air bag, and at least one steering wheel in the passenger compartment of the motor vehicle.

6. A computer readable medium having a computer program which is executable by a computer processor, comprising:
- a computer program arrangement having computer program code for determining at least one calibration parameter of at least one image sensor monitoring a scene of a passenger compartment of a motor vehicle in which at least a portion of the scene remains static over time, by performing the following:
- detecting a decalibration of the at least one image sensor during the operation of the at least one image sensor as a function of image signals;
- upon the detection of the decalibration, at least one of reporting the decalibration to at least one of a subsequent system and the driver, and determining the at least one calibration parameter as a function of the image signals; and
- deriving the image signals from at least one invariant pattern in the image coverage range of the at least one image sensor by the at least one image sensor;
- wherein the at least one invariant pattern is formed by at least one reference object applied in the scene for determining the at least one calibration parameter, and
- wherein the at least one reference object is applied to at least one object of the scene that is relevant with respect to a monitoring function of the at least one image sensor, wherein the at least one reference object is applied to at least one of at least one air bag flap, at least one air bag, and at least one steering wheel in the passenger compartment of the motor vehicle.

* * * * *